(12) United States Patent
Li

(10) Patent No.: US 7,391,747 B2
(45) Date of Patent: Jun. 24, 2008

(54) VARIABLE POWER ADJUSTMENT ACCESS METHOD IN CDMA MOBILE COMMUNICATION SYSTEM

(75) Inventor: Huajia Li, Shen Zhen (CN)

(73) Assignee: Huawei Technologies Co., Ltd., Shen Zhen (CN)

( * ) Notice: Subject to any disclaimer, the term of this patent is extended or adjusted under 35 U.S.C. 154(b) by 860 days.

(21) Appl. No.: 10/734,326

(22) Filed: Dec. 12, 2003

(65) Prior Publication Data

US 2004/0136354 A1 Jul. 15, 2004

Related U.S. Application Data

(63) Continuation of application No. PCT/CN02/00098, filed on Feb. 20, 2002.

(30) Foreign Application Priority Data

Jul. 20, 2001 (CN) ............................ 01 1 26300

(51) Int. Cl.
*H04B 7/185* (2006.01)
(52) U.S. Cl. .................. 370/318; 455/522; 455/127.1; 370/311
(58) Field of Classification Search .............. 370/318, 370/320, 335, 342, 441
See application file for complete search history.

(56) References Cited

U.S. PATENT DOCUMENTS 6,094,576 A 7/2000 Hakkinen et al.
2001/0026543 A1* 10/2001 Hwang et al. ............... 370/335

FOREIGN PATENT DOCUMENTS

| EP | 1315309 | 5/2003 |
| WO | WO 00/25443 | 5/2000 |
| WO | WO 01/37455 | 5/2001 |
| WO | WO 01/37455 A1 | 5/2001 |

* cited by examiner

*Primary Examiner*—Lester Kincaid
*Assistant Examiner*—Steven Lim
(74) *Attorney, Agent, or Firm*—Hamre, Schumann, Mueller & Larson, P.C.

(57) ABSTRACT

An access method for adjusting variable power in the CDMA mobile communication system includes obtaining acquisition information through receiving a prefix of a physical random access channel, and an access prefix and a conflict detection prefix of a physical common packet channel and evaluating quality, respectively; performing precise control of transmission power of a message section of the physical random access channel, and the conflict detection prefix, a power control prefix, and a message section of the physical common packet channel; transmitting a control indication of the precise control; and transmitting the message section of the physical random access channel, and the conflict detection prefix, the power control prefix, and the message section of the physical common packet channel by using a value among a plurality of power bias values.

8 Claims, 2 Drawing Sheets

VARIABLE POWER ADJUSTMENT ACCESS METHOD IN CDMA MOBILE COMMUNICATION SYSTEM

CROSS-REFERENCE TO RELATED APPLICATION(S)

This application is a continuation of International Application No. PCT/CN02/00098, filed on Feb. 20, 2002, which claims priority to Chinese Application No. 01 1 26300.8, filed on Jul. 20, 2001. The contents of both applications are incorporated herein by reference in their entirety.

FIELD OF THE INVENTION

The invention relates to the access of the mobile communication system, particularly, relates to an access method for the variable power adjustment. The said method supports the physical random access channel (PRACH) and the physical common packet channel (PCPCH) of the up link, the acquisition indication channel (AICH), the access prefix acquisition indication channel (AP-ACH), and the conflict detection/channel assignment indication channel (CD/CA-ICH) of the down link by more precise power control.

BACKGROUND OF THE INVENTION

In the access technology of the radio communication, there is an access method based on the fast indication. The burst data of the access can often be divided into several sections, the next section of the information is transmitted normally only when the responses of the data in the preceding sections (For example, an acquisition response, and the like) have been received. Normally, this type of responses only has responses with two values of 1 and −1, or with three values of 1, −1, and 0. Wherein, only one value, for example 1, is used for the indication acquired successfully and allowed to access. Thus, the more precise control function can not be sufficient.

Please refer to FIG. 1 and FIG. 2, in the access of the physical random access channel (PRACH) and the physical common packet channel (PCPCH) of the up channels in WCDMA, the fast indication method is used for indicating the prefix acquisition situation. For the physical random access channel (PRACH), the acquisition indication channel (AICH) is used to indicate the acquisition on the down link. For PCHCH, the access prefix acquisition indication channel (AP-ACH) and the conflict detection/channel assignment indication channel (CD/CA-ICH) are used. For the physical random access channel (PRACH), a value evaluated by the open loop power is firstly used by the user equipment as the transmission prefix of the initial transmission power. If the acquisition indication information of the down link acquisition indication channel (AICH) has not been received (or the received acquisition indication information is 0), then another prefix will continuously be transmitted subsequently by adding power ΔP0. If the received acquisition indication is −1, then it will exit the procedure and report to the upper layer. If the received acquisition indication is 1, then the information section will be transmitted by using a preamble power bias ΔPp-m corresponding to the last successful access.

In this way, because an error may be reach +/−12 dB under an extreme situation of the open loop power evaluation, and considering the throughput of the physical random access channel (PRACH), ΔP0 being not taken very small, and the affect of the channel fading, AP power which is accessed successfully at last and the acquisition probability at the said power may change significantly. If this is taken as a reference power to transmit the signals of the information section by increasing the power bias ΔPp-m (once this parameter is assigned by the high layer, all of the user equipment will use this fix parameter in a long period unless reassigning), the variation range of the power of the information section may also be very large, causing the comprehensive performance of accessing the entire physical random access channel (PRACH) worse.

The access procedure for the physical common packet channel (PCPCH) is slightly similar as that of the physical random access channel (PRACH), a transmitted access prefix AP is evaluated firstly by the user equipment based on the open loop power. If the acquisition indication information of the down link prefix acquisition indication channel (AP-AICH) is not received (or the acquisition indication is 0), then the prefix will continuously be transmitted by using power bias ΔP0. If the received acquisition indication is 1, then the conflict detection prefix (CD-P) will be transmitted by using the same power.

If the corresponding conflict detection prefix (CD-P) is not received in the conflict detection/channel assignment indication channel (CD/CA-ICH), then the procedure will be exited and reported to the upper layer. If it is received, then the power control prefix and the message section are transmitted by using the power bias of ΔPp-m.

For the same reason as that for accessing the physical random access channel (PRACH), AP power which is accessed successfully at last of the physical common packet channel (PCPCH) and the acquisition probability based on the said power may change significantly. In this way, the conflict detection transmitted subsequently and the power control prefix and the initial power of the message section will also change significantly. Thus, it causes the comprehensive performance of the entire link worse.

The frame format of the acquisition indication channel (AICH) in WCDMA is shown in FIG. 3, wherein, $$a_j = \sum_{s=0}^{15} AI_s b_{s,j}$$

The value of acquisition indication AI is taken as 1, 0, and −1 based on the result of the acquisition. S represents the sequence number of the characteristic code. See Table 1 for the value of bs and j (Table 1 is a characteristic code table of the acquisition indication channel):

TABLE 1

| s | $b_{s,0}, b_{s,1} \ldots, b_{s,31}$ | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|
| 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 1 | 1 | 1 | 1 | −1 | −1 | 1 | 1 | −1 | −1 | 1 | 1 | −1 | −1 | 1 | 1 | −1 | −1 | 1 | 1 | 1 | 1 | −1 | −1 | 1 | 1 | −1 | −1 | 1 | 1 | −1 | −1 | 1 |
| 2 | 1 | 1 | 1 | 1 | −1 | −1 | −1 | −1 | 1 | 1 | 1 | 1 | −1 | −1 | −1 | −1 | 1 | 1 | | | | | | | | | | | | | | |
| 3 | 1 | 1 | 1 | −1 | −1 | −1 | −1 | 1 | 1 | 1 | 1 | −1 | −1 | −1 | −1 | 1 | 1 | 1 | | | | | | | | | | | | | | |

TABLE 1-continued

| | | | | | | | | | | | | | | | | | |
|---|---|---|---|---|---|---|---|---|---|---|---|---|---|---|---|---|---|
| 4 | 1 | 1 | 1 | 1 | 1 | 1 | 1 | 1 | −1 | −1 | −1 | −1 | −1 | −1 | −1 | 1 | 1 |
| 5 | 1 | 1 | −1 | −1 | 1 | 1 | −1 | −1 | −1 | −1 | 1 | 1 | −1 | −1 | 1 | 1 | 1 |
| 6 | 1 | 1 | 1 | 1 | −1 | −1 | −1 | −1 | −1 | −1 | −1 | 1 | 1 | 1 | 1 | 1 | 1 |
| 7 | 1 | 1 | −1 | −1 | −1 | −1 | 1 | 1 | −1 | −1 | 1 | 1 | 1 | 1 | −1 | 1 | 1 |
| 8 | 1 | 1 | 1 | 1 | 1 | 1 | 1 | 1 | 1 | 1 | 1 | 1 | 1 | 1 | 1 | −1 | −1 |
| 9 | 1 | 1 | −1 | −1 | 1 | 1 | −1 | −1 | 1 | 1 | −1 | −1 | 1 | 1 | −1 | −1 | −1 |
| 10 | 1 | 1 | 1 | 1 | −1 | −1 | −1 | −1 | 1 | 1 | 1 | 1 | −1 | −1 | −1 | −1 | −1 |
| 11 | 1 | 1 | −1 | −1 | −1 | −1 | 1 | 1 | 1 | 1 | −1 | −1 | −1 | −1 | 1 | 1 | 1 |
| 12 | 1 | 1 | 1 | 1 | 1 | 1 | 1 | 1 | −1 | −1 | −1 | −1 | −1 | −1 | −1 | −1 | −1 |
| 13 | 1 | 1 | −1 | −1 | 1 | 1 | −1 | −1 | −1 | 1 | 1 | −1 | −1 | 1 | 1 | −1 | −1 |
| 14 | 1 | 1 | 1 | 1 | −1 | −1 | −1 | −1 | −1 | −1 | −1 | 1 | 1 | 1 | 1 | −1 | −1 |
| 15 | 1 | 1 | −1 | −1 | −1 | −1 | 1 | 1 | −1 | −1 | 1 | 1 | 1 | 1 | −1 | −1 | −1 |

| s | $b_{s,0}, b_{s,1} \ldots, b_{s,31}$ |
|---|---|
| 0 | 1 1 1 1 1 1 1 1 1 1 1 1 1 1 1 1 |
| 1 | −1 −1 1 1 −1 −1 1 1 −1 −1 1 1 −1 −1 1 1 |
| 2 | 1 1 −1 −1 −1 −1 1 1 1 1 −1 −1 −1 −1 1 1 |
| 3 | −1 −1 −1 −1 1 1 1 1 −1 −1 −1 −1 1 1 1 1 |
| 4 | 1 1 1 1 1 1 1 1 −1 −1 −1 −1 −1 −1 −1 −1 |
| 5 | −1 −1 1 1 −1 −1 1 1 1 1 −1 −1 1 1 −1 −1 |
| 6 | 1 1 −1 −1 −1 −1 1 1 −1 −1 1 1 1 1 −1 −1 |
| 7 | −1 −1 −1 −1 1 1 1 1 1 1 1 1 −1 −1 −1 −1 |
| 8 | −1 −1 −1 −1 −1 −1 −1 −1 −1 −1 −1 −1 −1 −1 −1 −1 |
| 9 | 1 1 −1 −1 1 1 −1 −1 1 1 −1 −1 1 1 −1 −1 |
| 10 | −1 −1 1 1 1 1 −1 −1 −1 −1 1 1 1 1 −1 −1 |
| 11 | 1 1 1 1 −1 −1 −1 −1 1 1 1 1 −1 −1 −1 −1 |
| 12 | −1 −1 −1 −1 −1 −1 1 1 1 1 1 1 1 1 1 1 |
| 13 | 1 1 −1 −1 1 1 1 1 −1 −1 1 1 −1 −1 1 1 |
| 14 | −1 −1 1 1 1 1 1 1 1 1 −1 −1 −1 −1 1 1 |
| 15 | 1 1 1 1 −1 −1 1 1 −1 −1 −1 −1 1 1 1 1 |

Thus, it is stipulated in the current protocol that the acquisition indication channel can only have three types of indications of 0, 1, and −1 for a certain characteristic code. Wherein, only the acquisition indication "1" is used to indicated that the accessing is allowed, however, more precise power control information cannot be provided.

The same format as that used for the acquisition indication channel (AICH) can be used to transmit the prefix acquisition indication channel (AP-ACH).

For the conflict detection/channel assignment indication channel (CD/CA-ICH), $$a_j = \sum_{i=0}^{15} CDI_i \times b_{s_i,j} + \sum_{k=0}^{15} CAI_k \times b_{s_k,j}$$

wherein, CDIi and CAIk generate the value, refer to Table 2 (Table 2 is a generation table for CDIi and CAIi in the conflict detection/channel assignment indication channel);

TABLE 2

| Conflict detection prefix i transmitted by user equipment i | $CDI_i$ | characteristic code $s_i$ | Channel assignment sequence number k | $CAI_k$ | Characteristic code $s_k$ |
|---|---|---|---|---|---|
| 0 | +1/0 | 1 | 0 | +1/0 | 0 |
| 1 | −1/0 | | 1 | −1/0 | |
| 2 | +1/0 | 3 | 2 | +1/0 | 8 |
| 3 | −1/0 | | 3 | −1/0 | |
| 4 | +1/0 | 5 | 4 | +1/0 | 4 |
| 5 | −1/0 | | 5 | −1/0 | |
| 6 | +1/0 | 7 | 6 | +1/0 | 12 |
| 7 | −1/0 | | 7 | −1/0 | |

TABLE 2-continued

| Conflict detection prefix i transmitted by user equipment i | $CDI_i$ | characteristic code $s_i$ | Channel assignment sequence number k | $CAI_k$ | Characteristic code $s_k$ |
|---|---|---|---|---|---|
| 8 | +1/0 | 9 | 8 | +1/0 | 2 |
| 9 | −1/0 | | 9 | −1/0 | |
| 10 | +1/0 | 11 | 10 | +1/0 | 10 |
| 11 | −1/0 | | 11 | −1/0 | |
| 12 | +1/0 | 13 | 12 | +1/0 | 6 |
| 13 | −1/0 | | 13 | −1/0 | |
| 14 | +1/0 | 15 | 14 | +1/0 | 14 |
| 15 | −1/0 | | 15 | −1/0 | |

Therefore, only two indications of 1 and −1 are used to indicate that the conflict detection has been acquired, and it is unable to provide to the user equipment the more precise control indication.

Because the power fluctuation range of the current physical random access channel (PRACH) and physical common packet channel (PCPCH) is very large when acquiring, however, only one indication is used for permitting access when the acquisition is successful, thus, it causes the fluctuation range of the subsequent information transmission power, which takes the said power as a power bias reference, of the subsequent sections also being very large, and causing the whole access performance degrading.

SUMMARY OF THE INVENTION

The object of the invention is to aim at the above disadvantages existing in the access transmission of code division multiple access and to provide an access method having variable power adjustment to increase the comprehensive performance of the entire system.

In order to realize the above object, the following technical scheme is employed in the invention:

An access method for the variable power adjustment in the code division multiple access mobile communication system of the invention, the said method is based on the base station and the user equipment, the acquisition information is obtained by the base station through receiving on the up link the prefix of the physical random access channel, the access prefix of the physical common packet channel and the conflict detection prefix and evaluating the quality, respectively; the precise control of the transmission power of the subsequent message section of the physical random access channel, conflict detection prefix of the physical common packet channel, and the power control prefix, the message section are obtained based on the quality evaluation value; the control indication of the said precise control is transmitted via the down link acquisition indication channel, access prefix acquisition indication channel, and conflict detection/channel assignment indication channel; and after receiving the said power control indication by the user equipment, the subsequent message section of the physical random access channel, conflict detection prefix of the physical common packet channel, and the power control prefix, the message section are transmitted by using a value among a plurality of power bias values.

Because after the above method being employed by the invention, the entire system can satisfy different functions, particularly, the functions of the transmission power being controlled more precisely, and the receive performance of the link being improved, it is indicated specifically as follows:

1. The accuracy of the power control of the up link transmitted physical random access channel and physical common packet channel, and the successful probability can be improved.

2. The average transmission power of the physical random access channel and physical common packet channel for achieving the same access performance can be saved, the interference to other channel can be decreased, and the capacity of the entire system can be increased.

DETAILED DESCRIPTION OF THE PREFERRED EMBODIMENTS

By analyzing the deficiencies in the aspect of the access acquisition indication of the prior schemes, a method of the invention provides a scheme, in which, the power transmission can be adjusted more precisely on the up link channels of the physical random access channel (PRACH) and the physical common packet channel (PCPCH), and more precise access acquisition indication can be provided on the corresponding down link acquisition indication channel (AICH), AP-acquisition indication channel (AICH), and conflict detection/channel assignment indication channel (CD/CA-ICH).

The method of the invention is based on the base station and the user equipment, the said method is based on the base station and the user equipment, the acquisition information is obtained by the base station through receiving on the up link the prefix of the physical random access channel, the common access prefix of the physical common packet channel and the conflict detection prefix and evaluating the quality, respectively; the precise control of the transmission power of the subsequent message section of the physical random access channel, conflict detection prefix of the physical common packet channel, and the power control prefix, the message section are obtained based on the quality evaluation value; the control indication of the said precise control is transmitted via the down link acquisition indication channel, access prefix acquisition indication channel, and conflict detection/channel assignment indication channel; and after receiving the said power control indication by the user equipment, the subsequent message section of the physical random access channel, conflict detection prefix of the physical common packet channel, and the power control prefix, the message section are transmitted by using a value among a plurality of power bias values.

Figure 1:
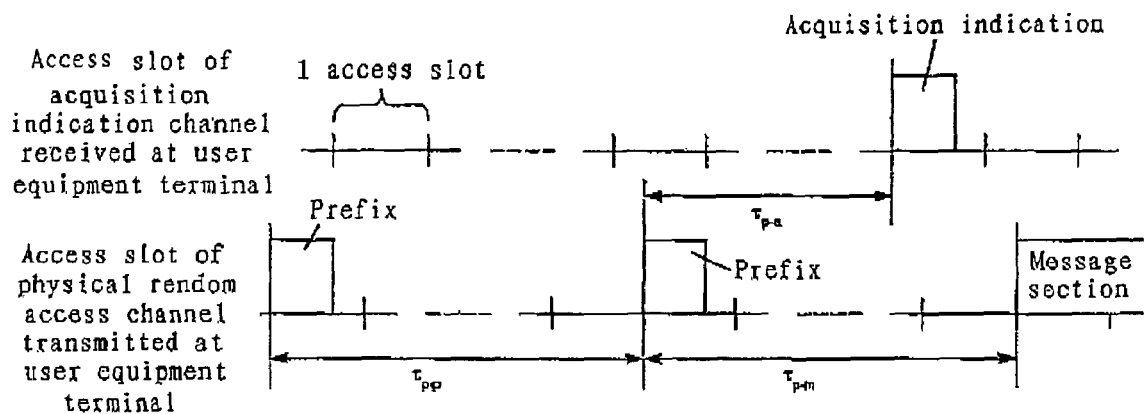
FIG. 1 is an illustration diagram of an access procedure of the physical random access channel of WCDMA.
Figure 2:
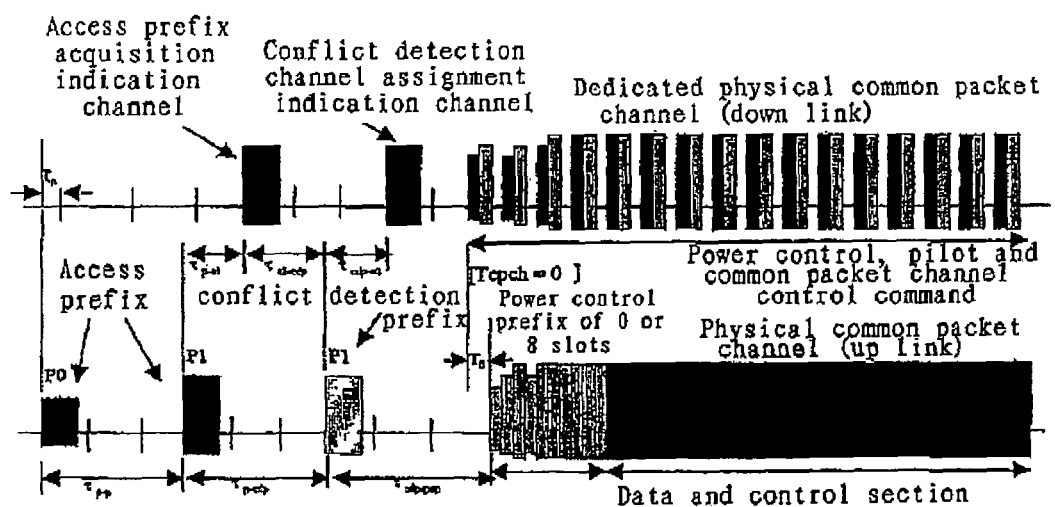
FIG. 2 is an illustration diagram of an access procedure of the physical common packet channel of WCDMA.
Figure 3:
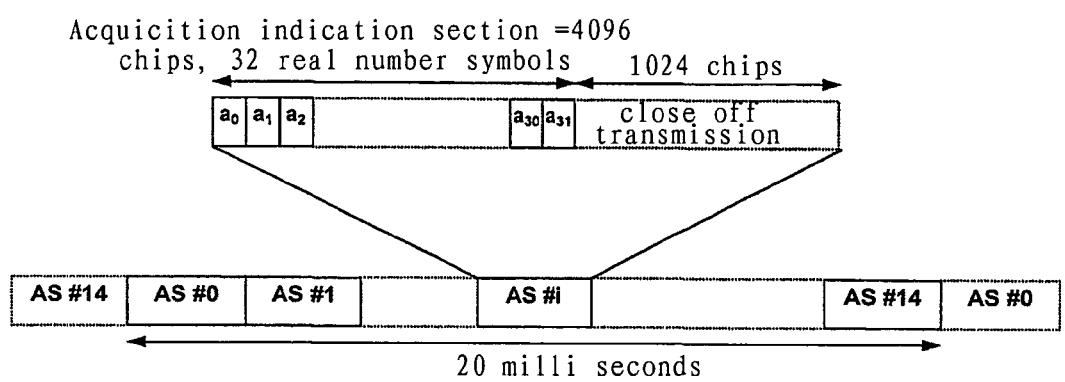
FIG. 3 is an illustration of a frame format for acquiring the indication channel.

Please refer to FIG. 3, the format of the acquisition indication channel and access prefix acquisition indication channel having the said precise control indication is:

$$a_{2k} = \sum_{s=0}^{15} AI_{1,s} P_s(k)$$

$$a_{2k+1} = \sum_{s=0}^{15} AI_{2,s} P_s(k), k = 0, 1 \ldots 15;$$

wherein, Ps(k) is a prefix characteristic code, please refer to Table 3 for its value (Table 3 is an acquisition indication channel characteristic code table employed in the invention):

TABLE 3

| prefix characteristic code | value of N | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| $P_0(n)$ | 1 | 1 | 1 | 1 | 1 | 1 | 1 | 1 | 1 | 1 | 1 | 1 | 1 | 1 | 1 | 1 |
| $P_1(n)$ | 1 | −1 | 1 | −1 | 1 | −1 | 1 | −1 | 1 | −1 | 1 | −1 | 1 | −1 | 1 | −1 |
| $P_2(n)$ | 1 | 1 | −1 | −1 | 1 | 1 | −1 | −1 | 1 | 1 | −1 | −1 | 1 | 1 | −1 | −1 |
| $P_3(n)$ | 1 | −1 | −1 | 1 | 1 | −1 | −1 | 1 | 1 | −1 | −1 | 1 | 1 | −1 | −1 | 1 |
| $P_4(n)$ | 1 | 1 | 1 | 1 | −1 | −1 | −1 | −1 | 1 | 1 | 1 | 1 | −1 | −1 | −1 | −1 |

TABLE 3-continued

| prefix characteristic code | value of N | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| $P_5(n)$ | 1 | −1 | 1 | −1 | −1 | 1 | −1 | 1 | 1 | −1 | 1 | −1 | −1 | 1 | −1 | 1 |
| $P_6(n)$ | 1 | 1 | −1 | −1 | −1 | −1 | 1 | 1 | 1 | 1 | −1 | −1 | −1 | −1 | 1 | 1 |
| $P_7(n)$ | 1 | −1 | −1 | 1 | −1 | 1 | 1 | −1 | 1 | −1 | −1 | 1 | −1 | 1 | 1 | −1 |
| $P_8(n)$ | 1 | 1 | 1 | 1 | 1 | 1 | 1 | 1 | −1 | −1 | −1 | −1 | −1 | −1 | −1 | −1 |
| $P_9(n)$ | 1 | −1 | 1 | −1 | 1 | −1 | 1 | −1 | −1 | 1 | −1 | 1 | −1 | 1 | −1 | 1 |
| $P_{10}(n)$ | 1 | 1 | −1 | −1 | 1 | 1 | −1 | −1 | −1 | −1 | 1 | 1 | −1 | −1 | 1 | 1 |
| $P_{11}(n)$ | 1 | −1 | −1 | 1 | 1 | −1 | −1 | 1 | −1 | 1 | 1 | −1 | −1 | 1 | 1 | −1 |
| $P_{12}(n)$ | 1 | 1 | 1 | 1 | −1 | −1 | −1 | −1 | −1 | −1 | −1 | −1 | 1 | 1 | 1 | 1 |
| $P_{13}(n)$ | 1 | −1 | 1 | −1 | −1 | 1 | −1 | 1 | −1 | 1 | −1 | 1 | 1 | −1 | 1 | −1 |
| $P_{14}(n)$ | 1 | 1 | −1 | −1 | −1 | −1 | 1 | 1 | −1 | −1 | 1 | 1 | 1 | 1 | −1 | −1 |
| $P_{15}(n)$ | 1 | −1 | −1 | 1 | −1 | 1 | 1 | −1 | −1 | 1 | 1 | −1 | 1 | −1 | −1 | 1 |

The values of $AI_1$ and $AI_2$ can be taken as 0, 1, and −1, nine control indications can be produced by combining $AI_1$ and $AI_2$. The format of the said conflict detection/channel assignment indication channel is:

$$a_{2l} = \sum_{i=0}^{15} CDI_{i,1} P_{Si}(l) + \sum_{k=0}^{15} CAI_{k,1} P_{Sk}(l)$$

$$a_{2l+1} = \sum_{i=0}^{15} CDI_{i,2} P_{Si}(l) + \sum_{k=0}^{15} CAI_{k,2} P_{Sk}(l), l = 0, 1 \ldots 15;$$

wherein, $CDI_1$, $CAI_2$, can be taken as 0, 1, and −1.

The definitions of T1, $T_0$, and $T_{−1}$ are as follows:

$T_1 = \{(1, 1), (1, 0), (0, 1)\}$;

$T_0 = \{(0, 0), (1, −1), (−1, 1)\}$;

$T_{−1} = \{(−1, −1), (−1, 0), (0, −1)\}$.

In the power adjustment of the messages of the said physical random access channel, when the acquisition indications of the received down link acquisition indication channel are (0, 0), (1, −1), (−1, 1), then the prefixes will be transmitted by using continuously the power bias ΔP0;

when (0, −1), (−1, 0), (−1, −1) are received, then the access will be exited and reported to the upper layer;

when (1, 1) is received, then the messages will be transmitted by using the power bias ΔPp−m;

when (1, 0) is received, then the messages will be transmitted by using the power bias ΔPp−m+ΔP1;

when (0, 1) is received, then the messages will be transmitted by using the power bias (ΔPp−m+2*ΔP1).

After the down link access prefix acquisition indication channel is received by the said physical common packet channel, when the access prefix acquisition indications received by the user equipment on the down link are (0, 0), (1, −1), (−1, 1), then the access prefixes will be transmitted by using continuously the power bias ΔP0;

when (0, −1), (−1, 0), (−1, −1) are received, then the access will be exited and reported to the upper layer;

when (1, 1) is received, then the messages will be transmitted by using the same power bias;

when (1, 0) is received, then the messages will be transmitted by using the power bias ΔP1;

when (0, 1) is received, then the messages will be transmitted by using the power bias (2*ΔP1).

After the indications of the transmission power bias indicated by the conflict detection/channel assignment indication channel is received by the said physical common packet channel, if it is in $T_0$ set, then the access procedure will be exited; if those in $T_1$ or $T_{−1}$ set are received, then an acquisition will be indicated, and the power biases of the subsequent power control prefixes and the messages will be determined by the specific values of $T_1$ or $T_{−1}$; when the received indication is (1, 1) or (−1, −1), then the power control prefixes and messages will be transmitted by using the power bias ΔPp−m; if the received indication is (1, 0) or (−1, 0), then the power control prefixes and messages will be transmitted by using the power bias (ΔPp−m+ΔP1); if the received indication is (0, 1) or (0, −1), then the power control prefixes and messages will be transmitted by using the power bias (ΔPp−m+2*ΔP1).

Similarly, the frame format in FIG. 3 is employed, however, wherein $$a_{2k} = \sum_{s=0}^{15} AI_{1,s} P_s(k)$$

$$a_{2k+1} = \sum_{s=0}^{15} AI_{2,s} P_s(k), k = 0, 1 \ldots 15;$$

The values of AI1 and AI2 can be taken as 0, 1, and −1. In this way, The value AI is composed of (AI1, AI2), and total 9 combinations are possible: (0, 0), (0, 1), (0, −1), (1, 0), (1, 1), (1, −1), (−1, 0), (−1, 1), and (−1, −1). In this way, sufficient acquisition indications can be transmitted to use for more precise power control or other usage.

For AP-acquisition indication channel (AICH), a modification method same as that of the acquisition indication channel (AICH) can be used.

For the conflict detection/channel assignment indication channel (CD/CA-ICH), $$a_{2l} = \sum_{i=0}^{15} CDI_{i,1} P_{Si}(l) + \sum_{k=0}^{15} CAI_{k,1} P_{Sk}(l)$$

$$a_{2l+1} = \sum_{i=0}^{15} CDI_{i,2} P_{Si}(l) + \sum_{k=0}^{15} CAI_{k,2} P_{Sk}(l), l = 0, 1 \ldots 15;$$

The generation of CDIi (composed of (CDIi, 1, CDIi, 2)) and CAIk (composed of (CAIk, 1, CAIk, 2)) can be defined in the following Table 4 (Table 4 is a generation table for CDIi and CAIi in the conflict detection/channel assignment indication channel employed in the invention):

TABLE 4

| Conflict detection prefix i transmitted by user equipment i | $CDI_i$ | charac- teristic code $s_i$ | Channel assignment sequence number k | $CAI_k$ | Characteristic code $s_k$ |
|---|---|---|---|---|---|
| 0  | $T_1/T_0$    | 1  | 0  | $T_1/T_0$    | 0  |
| 1  | $T_{-1}/T_0$ |    | 1  | $T_{-1}/T_0$ |    |
| 2  | $T_1/T_0$    | 3  | 2  | $T_1/T_0$    | 8  |
| 3  | $T_{-1}/T_0$ |    | 3  | $T_{-1}/T_0$ |    |
| 4  | $T_1/T_0$    | 5  | 4  | $T_1/T_0$    | 4  |
| 5  | $T_{-1}/T_0$ |    | 5  | $T_{-1}/T_0$ |    |
| 6  | $T_1/T_0$    | 7  | 6  | $T_1/T_0$    | 12 |
| 7  | $T_{-1}/T_0$ |    | 7  | $T_{-1}/T_0$ |    |
| 8  | $T_1/T_0$    | 9  | 8  | $T_1/T_0$    | 2  |
| 9  | $T_{-1}/T_0$ |    | 9  | $T_{-1}/T_0$ |    |
| 10 | $T_1/T_0$    | 11 | 10 | $T_1/T_0$    | 10 |
| 11 | $T_{-1}/T_0$ |    | 11 | $T_{-1}/T_0$ |    |
| 12 | $T_1/T_0$    | 13 | 12 | $T_1/T_0$    | 6  |
| 13 | $T_{-1}/T_0$ |    | 13 | $T_{-1}/T_0$ |    |
| 14 | $T_1/T_0$    | 15 | 14 | $T_1/T_0$    | 14 |
| 15 | $T_{-1}/T_0$ |    | 15 | $T_{-1}/T_0$ |    |

Three sets are defined, for example:

T1={(1, 1), (1, 0), (0, 1)};

T0={(0, 0), (1, −1), (−1, 1)};

T−1={(−1, −1), (−1, 0), (0, −1)};

The conditions of the sets may be those, but it is not limited.

AI indications with more values can be received by the user equipment in the channel of the up link physical random access channel (PRACH). The power adjustment can be performed more precisely to transmit the subsequent messages based on theses received indications. One adjustment scheme is that after Preamble being transmitted by the user equipment, if the acquisition indications of the received down link acquisition indication channel (AICH) are (0, 0), (1, −1), (−1, 1), then Preamble will be transmitted by using continuously the power bias ΔP0. If (0, −1), (−1, 0), (−1, −1) are received, then the procedure will be exited and the upper layer will be reported to. If (1, 1) is received, then the messages are transmitted by using the power bias ΔPp−m. If (1, 0) is received, then the messages will be transmitted by using the power bias (ΔPp−m+ΔP1). If (0, 1) is received, then the messages will be transmitted by using the power bias (ΔPp−m+2*ΔP1).

If more acquisition power adjustment indications are to be added, the other received information can be defined as the power adjustment indications, for example, (1, −1), (−1, 1), and the like.

Similarly, in the up link physical common packet channel (PCPCH), when the indications (0, 0), (1, −1), (−1, 1) of AP-AI are received by the user equipment on the down link, then AP will be transmitted by using continuously the power bias ΔP0.

If (0, −1), (−1, 0), (−1, −1) are received, then the procedure will be exited and the upper layer will be reported to. If (1, 1) is received, then CD-P will be transmitted by using the same power bias. If (1, 0) is received, then the CD-P will be transmitted by using the power bias ΔP1. If (0, 1) is received, then CD-P will be transmitted by using the power bias 2*ΔP1.

If after CD being transmitted by the user equipment and the acquisition indication for CD-P being received in the down link conflict detection/channel assignment indication channel (CD/CA-ICH), if it is in T0 set, then the procedure will be exited. If T1 set or T−1 set (based on the SIGNATURE number for transmitting CD-P, and the same hereinafter) is received, then an acquisition will be indicated. The subsequent power bias of PCP and the messages will be determined based on the specific values of T1 or T−1: when the received indication is (1, 1) or (−1, −1), then PCP and the messages will be transmitted by using the power bias ΔPp−m. If the received indication is (1, 0) or (−1, 0), then the PCP and the messages will be transmitted by using the power bias (ΔPp−m+ΔP1). If the received indication is (0, 1), or (0, −1), then PCP and the messages will be transmitted by using the power bias (ΔPp−m+2*ΔP1).

What is claimed is:

1. An access method for variable power adjustment in a code division multiple access mobile communication system, the method being based on a base station and user equipment, comprising:

obtaining acquisition information by the base station through receiving via an up link a prefix of a physical random access channel, and an access prefix and a conflict detection prefix of a physical common packet channel and evaluating quality, respectively, the acquisition information being represented by a matrix containing at least two numbers;

performing precise control of transmission power of a message section of the physical random access channel, and the conflict detection prefix, a power control prefix, and a message section of the physical common packet channel being obtained based on quality evaluation values obtained from evaluating the quality;

transmitting a control indication of the precise control via an acquisition indication channel, an access prefix acquisition indication channel, and a conflict detection/channel assignment indication channel of a down link; and after the control indication being received by the user equipment, transmitting the message section of the physical random access channel, and the conflict detection prefix, the power control prefix, and the message section of the physical common packet channel by using a value among a plurality of power bias values.

2. An access method as claim 1, wherein, a format of the acquisition indication channel and the access prefix acquisition indication channel that have the control indication of the precise control is:

$$a_{2k} = \sum_{s=0}^{15} AI_{1,s} P_s(k)$$

$$a_{2k+1} = \sum_{s=0}^{15} AI_{2,s} P_s(k), k = 0, 1 \ldots 15;$$

wherein, $P_s(k)$ is a prefix characteristic code, values of $AI_1$ and $AI_2$ can be taken as 0, 1, and −1, nine control indications can be produced by combining $AI_1$ and $AI_2$.

3. An access method as claim 1, wherein, a format of the conflict detection/channel assignment indication channel is:

$$a_{2l} = \sum_{i=0}^{15} CDI_{i,1} P_{Si}(l) + \sum_{k=0}^{15} CAI_{k,1} P_{Sk}(l)$$

$$a_{2l+1} = \sum_{i=0}^{15} CDI_{i,2} P_{Si}(l) + \sum_{k=0}^{15} CAI_{k,2} P_{Sk}(l), l = 0, 1 \ldots 15;$$

wherein, each of $CDI_1$, $CAI_2$ can be taken as 0, 1, and −1;

definitions of $T_1$, $T_0$, and $T_{-1}$ being as follows:

$T_1$={(1, 1), (1, 0), (0, 1)};

$T_0$={(0, 0), (1, −1), (−1, 1)};

$T_{-1}$={(−1, −1), (−1, 0), (0, −1)}.

4. An access method of claim 1, wherein, in power adjustment of the message section of the physical random access channel, when any of acquisition indications of (0, 0), (1, −1), (−1, 1) of acquisition indication channel is received via the down link, transmitting the prefix of the physical random access channel by continuously using a power bias ΔP0;

when any of acquisition indications of (0, −1), (−1, 0), (−1, −1) is received, exiting the access and reporting to an upper layer;

when an acquisition indication of (1, 1) is received, transmitting the message section by using a power bias ΔPp-m;

when an acquisition indication of (1, 0) is received, transmitting the message section by using a power bias ΔPp-m+ΔP1;

when an acquisition indication of (0, 1) is received, transmitting the message section by using a power bias (ΔPp-m+2*ΔP1).

5. An access method of claim 1, wherein, after an acquisition indication of the access prefix acquisition indication channel is received by the physical common packet channel via the down link, when any of acquisition indications of (0, 0), (1, −1), (−1, 1) is received by the user equipment, transmitting the access prefix by continuously using a power bias ΔP0;

when any of acquisition indications of (0, −1), (−1, 0), (−1, −1) is received, exiting the access and reporting to an upper layer;

when an acquisition indication of (1, 1) is received, transmitting the message section by using the same power bias;

when an acquisition indication of (1, 0) is received, transmitting the message section by using a power bias ΔP1;

when an acquisition indication of (0, 1) is received, transmitting the message section by using a power bias (2*ΔP1).

6. An access method of claim 1, wherein, after a transmission power bias indication of the conflict detection/channel assignment indication channel is received by the physical common packet channel, when the power bias indication falls within a $T_0$ set, exiting the access;

when the power bias indication falling within a $T_1$ set or a $T_{-1}$ set is received, an acquisition is indicated, and transmission power biases of the power control prefix and the message section are determined by specific values of $T_1$ or $T_{-1}$;

when any of power bias indications of (1, 1) or (−1, −1) is received, transmitting the power control prefix and the message section by using a power bias ΔPp-m;

when any of power bias indications of (1, 0) or (−1, 0) is received, transmitting the power control prefix and the message section by using a power bias (ΔPp-m+ΔP1); and when any of power bias indications of (0, 1) or (0, −1) is received, transmitting the power control prefix and the message section by using a power bias (ΔPp-m+2*ΔP1).

7. An access method for variable power adjustment in a code division multiple access mobile communication system, the method being based on a base station and a user equipment, comprising:

obtaining acquisition information by the base station through receiving via an up link a prefix of a physical random access channel, and an access prefix and a conflict detection prefix of a physical common packet channel and evaluating quality, respectively;

performing precise control of transmission power of a message section of the physical random access channel, and the conflict detection prefix, a power control prefix, and a message section of the physical common packet channel being obtained based on quality evaluation values obtained from evaluating the quality;

transmitting a control indication of the precise control via an acquisition indication channel, an access prefix acquisition indication channel, and a conflict detection/channel assignment indication channel of a down link; and after the control indication being received by the user equipment, transmitting the message section of the physical random access channel, and the conflict detection prefix, the power control prefix, and the message section of the physical common packet channel by using a value among a plurality of power bias values, wherein, a format of the acquisition indication channel and the access prefix acquisition indication channel that have the control indication of the precise control is:

$$a_{2k} = \sum_{s=0}^{15} AI_{1,s} P_s(k)$$

$$a_{2k+1} = \sum_{s=0}^{15} AI_{2,s} P_s(k), k = 0, 1 \ldots 15;$$

wherein, Ps(k) is a prefix characteristic code, values of $AI_1$ and $AI_2$ can be taken as 0, 1, and −1, nine control indications can be produced by combining $AI_1$ and $AI_2$.

8. An access method for variable power adjustment in a code division multiple access mobile communication system, the method being based on a base station and a user equipment, comprising:

obtaining acquisition information by the base station through receiving via an up link a prefix of a physical random access channel, and an access prefix and a conflict detection prefix of a physical common packet channel and evaluating quality, respectively;

performing precise control of transmission power of a message section of the physical random access channel, and the conflict detection prefix, a power control prefix, and a message section of the physical common packet channel being obtained based on quality evaluation values obtained from evaluating the quality;

transmitting a control indication of the precise control via an acquisition indication channel, an access prefix acquisition indication channel, and a conflict detection/channel assignment indication channel of a down link; and after the control indication being received by the user equipment, transmitting the message section of the physical random access channel, and the conflict detection prefix, the power control prefix, and the message section of the physical common packet channel by using a value among a plurality of power bias values, wherein, a format of the conflict detection/channel assignment indication channel is:

$$a_{2l} = \sum_{i=0}^{15} CDI_{i,1} P_{Si}(l) + \sum_{k=0}^{15} CAI_{k,1} P_{Sk}(l)$$

$$a_{2l+1} = \sum_{i=0}^{15} CDI_{i,2} P_{Si}(l) + \sum_{k=0}^{15} CAI_{k,2} P_{Sk}(l), 1 = 0, 1 \ldots 15;$$

wherein, each of $CDI_1$, $CAI_2$ can be taken as 0, 1, and −1;

definitions of $T_1$, $T_0$, and $T_{-1}$ being as follows:

$T_1 = \{(1, 1), (1, 0), (0, 1)\}$;

$T_0 = \{(0, 0), (1, -1), (-1, 1)\}$;

$T_{-1} = \{(-1, -1), (-1, 0), (0, -1)\}$.

* * * * *